United States Patent
Patil et al.

(10) Patent No.: US 12,091,609 B2
(45) Date of Patent: Sep. 17, 2024

(54) ADDITIVE FOR ENHANCED OIL RECOVERY

(71) Applicant: DOW GLOBAL TECHNOLOGIES LLC, Midland, MI (US)

(72) Inventors: Pramod Dhanaji Patil, Sugar Land, TX (US); Mechelle Churchfield, Auburn, MI (US); Peng Gao, Shanghai (CN); Troy E. Knight, Missouri City, TX (US); Wanglin Yu, Pearland, TX (US); Amit Katiyar, Sugar Land, TX (US); Neeraj Rohilla, Houston, TX (US); Biplab Mukherjee, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 28 days.

(21) Appl. No.: 17/597,814

(22) PCT Filed: Aug. 15, 2019

(86) PCT No.: PCT/CN2019/100780
§ 371 (c)(1),
(2) Date: Jan. 25, 2022

(87) PCT Pub. No.: WO2021/026883
PCT Pub. Date: Feb. 18, 2021

(65) Prior Publication Data
US 2022/0251438 A1    Aug. 11, 2022

(51) Int. Cl.
*C09K 8/588*    (2006.01)
*C08G 83/00*    (2006.01)
(Continued)

(52) U.S. Cl.
CPC ............ *C09K 8/588* (2013.01); *C08G 83/005* (2013.01); *C09K 8/592* (2013.01); *C09K 8/594* (2013.01); *E21B 43/20* (2013.01); *E21B 43/24* (2013.01)

(58) Field of Classification Search
CPC ........ C09K 8/588; C09K 8/592; C09K 8/594; C08G 83/005; E21B 43/20; E21B 43/24;
(Continued)

(56) References Cited

U.S. PATENT DOCUMENTS 3,039,529 A * 6/1962 Mckennon ............. C09K 8/588
166/275
3,885,626 A    5/1975 Gale et al.
(Continued)

FOREIGN PATENT DOCUMENTS

CA    2013514    9/1990
CN    102703052 B    5/2014
(Continued)

OTHER PUBLICATIONS

Zhang et al.., Methacrylated Hyperbranched Polyglycerol as a High-Efficiency Demulsifier for Oil-in-Water Emulsions, Oct. 10, 2016, energy & fuels, retrieved Mar. 14, 2023 from https://pubs.acs.org/doi/full/10.1021/acs.energyfuels.6b01631 (Year: 2016).*
(Continued)

*Primary Examiner* — Angela M DiTrani Leff

(57) ABSTRACT

A method of enhanced oil recovery that includes injecting a composition including an hyperbranched polyglycerol into an injection well in a subterranean oil-bearing reservoir, the hyperbranched polyglycerol being a primary alcohol that is a reaction product of a C2 to C25 carbon alcohol and a plurality of glycidols; and displacing oil in the subterranean oil-bearing reservoir using the composition.

6 Claims, 1 Drawing Sheet

(51) Int. Cl.
*C09K 8/592* (2006.01)
*C09K 8/594* (2006.01)
*E21B 43/20* (2006.01)
*E21B 43/24* (2006.01)

(58) Field of Classification Search
CPC ... E21B 43/16; E21B 43/2406; E21B 43/2408
See application file for complete search history.

(56) References Cited

U.S. PATENT DOCUMENTS

| | | | |
|---|---|---|---|
| 4,088,190 A | | 5/1978 | Fischer et al. |
| 4,540,049 A | | 9/1985 | Hawkins et al. |
| 4,738,789 A | | 4/1988 | Jones |
| 4,739,831 A | | 4/1988 | Settlemeyer et al. |
| 4,799,547 A | | 1/1989 | Borchardt |
| 4,828,029 A | | 5/1989 | Irani |
| 4,856,588 A | | 8/1989 | Borchardt |
| 4,967,837 A | | 11/1990 | Danzik |
| 5,005,644 A | | 4/1991 | Wall et al. |
| 5,052,487 A | | 10/1991 | Wall |
| 5,083,612 A | * | 1/1992 | Ashrawi ............ C09K 8/592 507/936 |
| 5,358,045 A | | 10/1994 | Sevigny et al. |
| 5,363,915 A | | 11/1994 | Marquis et al. |
| 8,973,668 B2 | | 1/2015 | Sanders et al. |
| 8,950,494 B2 | | 2/2015 | Nguyen et al. |
| 2009/0078414 A1 | | 3/2009 | Horvath Szabo et al. |
| 2009/0264324 A1 | | 10/2009 | Kurian et al. |
| 2012/0220502 A1 | | 8/2012 | Jurgenson et al. |
| 2012/0285694 A1 | | 11/2012 | Morvan et al. |
| 2013/0341012 A1 | * | 12/2013 | Belani ............ E21B 43/166 166/250.12 |
| 2014/0209304 A1 | | 7/2014 | Reed et al. |
| 2016/0251568 A1 | * | 9/2016 | Do ............ C09K 8/602 166/270.1 |
| 2019/0010381 A1 | * | 1/2019 | Nguyen ............ C09K 8/584 |
| 2020/0123434 A1 | * | 4/2020 | Alamdari ............ C09K 8/588 |

FOREIGN PATENT DOCUMENTS

| | | | | |
|---|---|---|---|---|
| CN | 103980873 A | | 8/2014 | |
| CN | 104844765 A | | 8/2015 | |
| CN | 108729893 A | | 11/2018 | |
| JP | S6094126 | | 5/1985 | |
| JP | 2011088867 | | 5/2011 | |
| WO | 2009084479 | | 7/2009 | |
| WO | 2009131937 A2 | | 10/2009 | |
| WO | WO-2021021101 A1 | * | 2/2021 | ............ C09K 8/50 |

OTHER PUBLICATIONS

Teixeira et al. Hyperbranched Polyglycerols Obtained from Environmentally Benign Monomer, as Reactive Clays Inhibitors for Water-Based Drilling Fluids, 2014, Journal of Applied Polymer Science, retrieved Mar. 14, 2023 from https://onlinelibrary.wiley.com/doi/epdf/10.1002/app.40384 (Year: 2014).*

Elmobarak et al., Enhanced oil recovery using hyperbranched polyglycerol polymer-coated silica nanoparticles, 2021, Chemosphere, retrieved Mar. 14, 2023 from https://www.sciencedirect.com/science/article/pii/S0045653521017677?via%3Dihub#bib 18 (Year: 2021).*

Ferreira et al., Partially hydrophobized hyperbranched polyglycerols as non-ionic reactive shale inhibitors for water based drilling fluids, Nov. 2016, Applied Clay Science, retrieved Mar. 14, 2023 from https://www.sciencedirect.com/science/article/pii/S0169131716302204#bb0110 (Year: 2016).*

Sunder et al., Controlled Synthesis of Hyperbranched Polyglycerols by Ring-Opening Multibranching Polymerization, 1999, Macromolecules, 32, 4240-4246, retrieved Mar. 14, 2023 from https://pubs.acs.org/doi/full/10.1021/ma990090w (Year: 1999).*

Seiler et al., Experimental data and theoretical considerations on vapor-liquid and liquid-liquid equilibria of hyperbranched polyglycerol and PVA solutions, 2002, Fluid Phase Equilibria, retrieved Mar. 14, 2023 from https://www.sciencedirect.com/science/article/pii/S0378381202000821#BIB20 (Year: 2002).*

Sunder, "Controlled Synthesis of Hyperbranched Polyglycerols by Ring-Operating Multibranching Polymerization" Macromolecules, 1999, p. 4240-4246, vol. 32, No. 13.

PCT/CN2019/100780, International Search Report and Written Opinion with a mailing date of May 7, 2020.

PCT/CN2019/100780, International Preliminary Report on Patentability with a mailing date of Feb. 8, 2022.

* cited by examiner

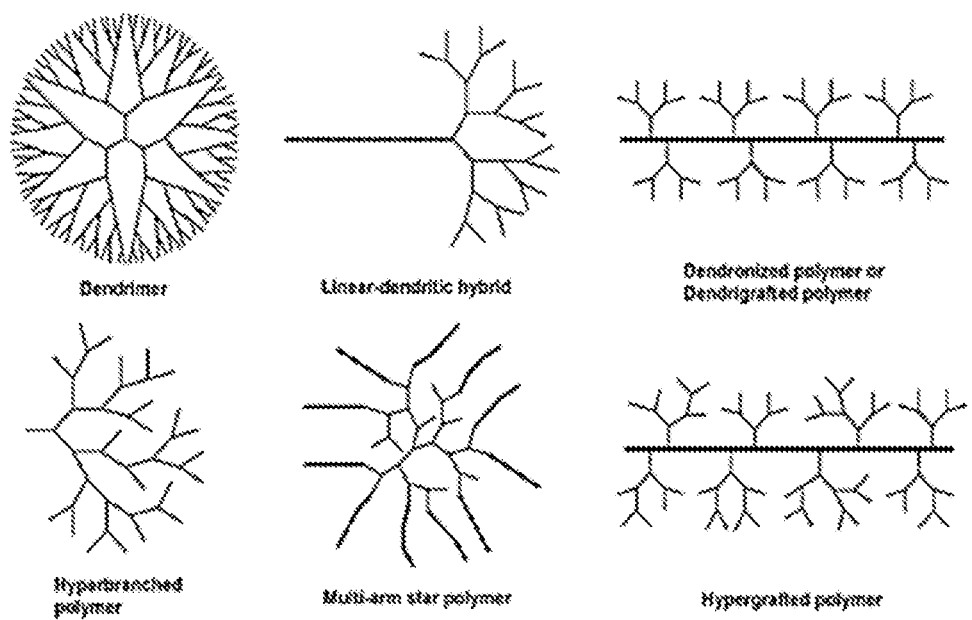

ADDITIVE FOR ENHANCED OIL RECOVERY

FIELD

Embodiments relate to an additive for use in enhanced oil recovery.

INTRODUCTION

Only a portion of the oil originally present in a subterranean oil-bearing reservoir is recovered during a primary production process that uses the reservoir's natural energy (such as fluid and rock expansion, solution-gas drive, gravity drainage, and aquifer influx) to produce oil. Various enhanced oil recovery process may be used to increase the production from oil reservoirs, which enhanced recovery process may follow the primary production process. Enhanced oil recovery processes may be accomplished by the injection of materials such as water, steam, hydrocarbons, and/or carbon dioxide into the subterranean reservoir to displace oil from pore spaces, but the efficiency of such displacement may depend on many factors, such as oil viscosity and rock characteristics. Further, surfactants may be added as foaming agents in the enhanced oil processes. Enhanced oil recovery processes should displace oil from pore spaces, but the efficiency of such displacement depends on many factors (e.g., oil viscosity and rock characteristics). As such, other additives are sought that both can enhance the effectiveness of enhanced oil recovery methods and tolerate the harsh conditions of the subterranean reservoir and the enhanced oil recovery processes. It is proposed to use hyperbranched polyglycerols that are the reaction product of a C2 to C25 carbon alcohol and glycidol to further improve variously enhanced oil recovery processes, which hyperbranched polyglycerols can be combined with surfactants.

SUMMARY

Embodiments may be realized by a method of enhanced oil recovery that includes injecting a composition including an hyperbranched polyglycerol into an injection well in a subterranean oil-bearing reservoir, the hyperbranched polyglycerol being a primary alcohol that is a reaction product of a C2 to C25 carbon alcohol and a plurality of glycidols; and displacing oil in the subterranean oil-bearing reservoir using the composition.

BRIEF DESCRIPTION OF THE DRAWINGS

The FIGURE is a pictorial representation of Various Subclasses including dendrimer, linear-dendritic hybrid, dendronized polymer or dendrigraft polymer, hyperbranched polymer, multi-arm star polymer, and hypergrafted polymer.

DETAILED DESCRIPTION

Various processes may be used for enhanced oil recovery. Exemplary processes include the following:

CSS—Cyclic Steam Stimulation, where steam is injected into a well for a period of weeks to months. The well may be allowed to sit for days to weeks to allow heat to soak into the formation. Then, pumping out of the hot oil from the well is started and once the production rate falls off, the well may be put through another cycle of steam injection, soak and production. This process can be repeated until the cost of injecting steam becomes higher than the benefit of producing oil from that. Recovery factors may be high, but the cost to inject steam is high.

SAGD—Steam Assisted Gravity Drainage. where at least two horizontal wells are used, one at the bottom of the formation and another above it. Steam is injected into the upper well and the heat reduces the viscosity of the heavy oil, which allows it to drain by gravity into the lower well, where it is pumped to the surface.

VAPEX—Vapor Extraction Process is similar to SAGD, but instead of steam, hydrocarbons and/or other gases are injected into an upper well to dilute heavy oil and enable the diluted heavy oil to flow into a lower well.

Chemical Flooding, such as waterflooding, where water is injected into the well to increase the reservoir pressure to its initial level and maintain it near that pressure. The water used for waterflooding may be the saline water or brine recovered from the primary production process (i.e., recycled water from the subterranean oil-bearing formation).

The enhanced oil recovery process may include use of a foam forming composition, which may be used as its own foam-assisted enhanced oil recovery process or in combination with another recovery process.

The effectiveness of various enhanced oil recovery processes may depend at least on the mobility ratio between the oil and the composition used in the enhanced oil recovery process. For example, wettability of the reservoir rocks, and surface tension between the water and oil, especially in geological formations in subterranean reservoirs, may impact the efficiency of the oil recovery process. Further, certain conventional additives may not be effective in the harsh conditions found in subterranean reservoirs and/or the recycled water. Accordingly, additives are sought that can enhance the effectiveness of enhanced oil recovery methods, while tolerating the harsh conditions of the subterranean reservoir (such as surfactants, steam, and/or recycled water).

The effectiveness of enhanced oil recovery process may be altered by, e.g., (i) adjusting the oil/liquid (or gas) mobility ratio by increasing displacing fluid viscosity to increase oil recovery, (ii) altering the wettability of reservoir rocks to more wet to increase oil recovery, and (iii) reducing surface tension between the liquid (or gas) and the oil.

The hyperbranched polyglycerol is a primary alcohol that is a reaction product of a C2 to C25 carbon alcohol and plurality glycidols. An exemplary schematic is shown below where the C2 to C25 carbon alcohol is depicted as ROH and an exemplary structure for the hyperbranched polyglycerol is shown.

ROH

-continued

RO⁻Na⁺

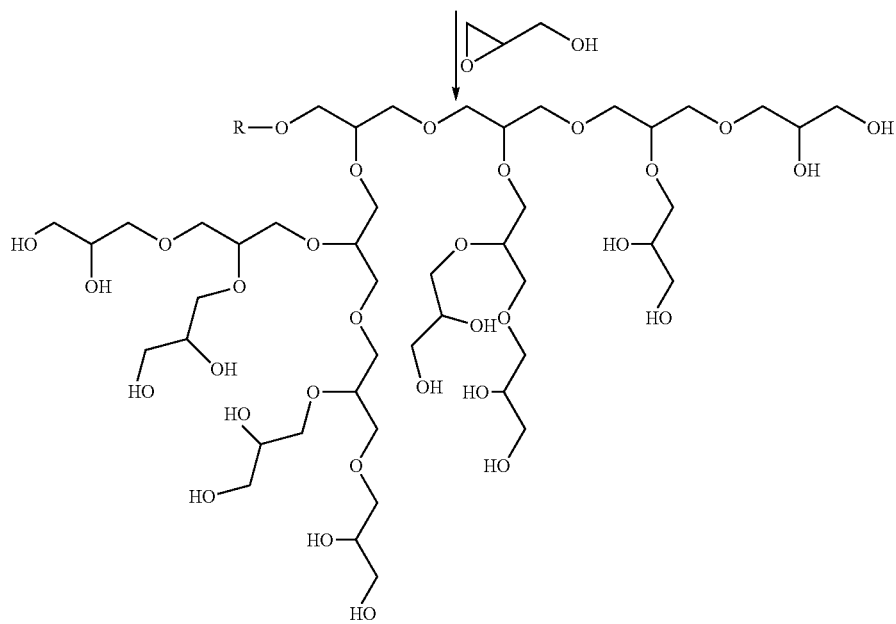

By hyperbranched it is meant that the polyglycerol is highly branched and includes at least 2 branches (e.g., at least 4 branches, at least 5 branches, etc.). The hyperbranched polyglycerol has a classification of a dendritic architecture (tree-like and is considered to be unique non-linear structure), with the sub-classification of hyperbranched polymer. By Dendritic polymer it is meant the following type of polymer as is known in the field of polymer chemistry:

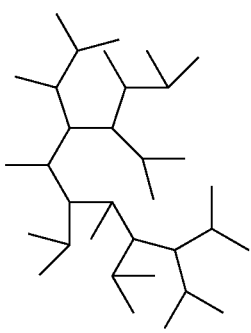 [SMILES: CC(C)C(C)C(C(C)C)C(C(C)C(C)C)C(C)C(C(C)C)C(C)C(C(C)C)C(C(C)C)C(C)C]

Various Subclasses include dendrimer, linear-dendritic hybrid, dendronized polymer or dendrigraft polymer, hyperbranched polymer, multi-arm star polymer, and hypergrafted polymeras shown in the FIGURE.

The embodiments relate specially to the hyperbranched polymer sub-classification under the dendritic polymer classification. The hyperbranched polymers possess a randomly branched structure, with one precise one focal unit being the primary alcohol (which is an initiator) and at least two branching points being the plurality glycidol.

By C2 to C25 carbon alcohol it is meant that the alcohol includes from 2 to 25 carbon atoms (e.g., C4 to C25 that includes from 4 to 25 carbon atoms, C5 to C22 that includes from 5 to 2 carbon atoms, C5 to C20 that includes from 5 to 20 carbon atoms, C8 to C18 that includes from 8 to 18 carbon atoms, and other ranges therebetween). By alcohol it is meant that C2 to C25 carbon alcohol has at least one hydroxyl group, it may be a monol with one hydroxyl group or a polyol with 2 or more hydroxyl groups. The C2 to C25 carbon alcohol may be linear, branched, or cyclic and may optionally have one or more hydrogen substituted by Cl, F, or CN. In exemplary embodiments, the C2 to C25 carbon alcohol may be a unsubstituted hydrocarbon monol (includes only carbon atoms, hydrogen atoms, and one oxygen atom).

By plurality of glycidols it is meant that two or more glycidols monomers such that glycidol addition through ring opening polymerization is performed on the C2 to C25 carbon alcohol to form a higher molecular weight polymer. By glycidol it is meant a monomer with the following structure:

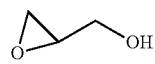

By primary alcohol it is meant that the hyperbranched polyglycerol includes at least one terminal hydroxyl groups (a primary alcohol group). The hyperbranched polyglycerol may be a multi-branched polymer that includes two terminal hydroxyl groups at the end of each branch, e.g., as shown in the following exemplary structure:

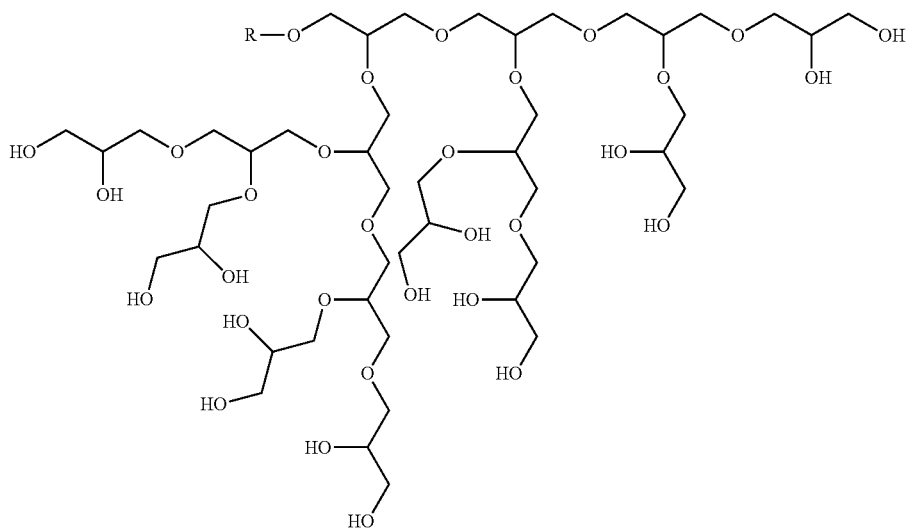

The hyperbranched polyglycerol may have varying molecular weights, as is typical with hyperbranched polymers. An exemplary, number average molecular weight range of individual hyperbranched polyglycerol polymers is from 100 g/mol to 100,000 g/mol (e.g., from 100 g/mol to 75,000 g/mol, from 100 g/mol to 50,000 g/mol, from 100 g/mol to 25,000 g/mol, from 100 g/mol to 10,000 g/mol, from 100 g/mol to 5,000 g/mol, from 100 g/mol to 3,000 g/mol, etc.). The hyperbranched polyglycerol may be used as an additive that is present in an amount from 0.001 wt % to 10.000 wt %, based on a total weight of a composition that is placed down a subterranean oil-bearing reservoir for enhanced oil recovery (whereas the composition may include water and/or steam and/or other additives). The hyperbranched polyglycerol may have a nominal hydroxyl functionality of at least 4 (e.g., from 4 to 100, from 6 to 90, from 8 to 80, from 10 to 70, from 10 to 60, from 10 to 50, from 10 to 40, from 10 to 30, from 10 to 20, etc.). In particular, as the hyperbranched polyglycerol is a hyperbranched polymer, it has unique structures and properties such as abundant hydroxyl functional groups.

The hyperbranched polyglycerol may be synthesized in a one-shot process (batch process) and/or using gradual addition of the glycidol (semi-batch process). Gradual addition of glycidol may be used to control polydispersity. The resultant hyperbranched polyglycerol may have a low polydispersity (such as less than 4 and/or greater than 1).

It is believed the hyperbranched polyglycerols may be comparably and/or more stable at high temperature and/or high salinity conditions, e.g., compared to commercially available alpha-olefin sulfonates, while still being well suited for use in enhanced oil recovery. For example, the hyperbranched polyglycerols may act as foam boosters (for foam-assisted enhanced oil recovery). The hyperbranched polyglycerols may act wettability agents in oil recovery processes. The hyperbranched polyglycerols may be stable at high temperatures of at least 140° C. (e.g., see cloud point and CMC data in Table 1). The hyperbranched polyglycerols may provide desirable interfacial (surface) tension even at high temperatures, e.g., compared to traditional surfactants, such that the hyperbranched polyglycerols may be highly suited for use in oil recovery (e.g., see IFT data in Table 2). The viscosity of the hyperbranched polyglycerols may be adjusted with simple solvents such as water, to be useable in various types of enhanced oil recovery (e.g., see HPG/water blend viscosity data in Table 3). It is desirable to be able to tailor the viscosity of additives based on the conditions of specific enhanced oil recovery processes and/or conditions of the subterranean reservoir. The hyperbranched polyglycerols may be stable, such that phase separation is not observed, in high salinity conditions even at high temperatures of at least 80° C. (e.g., see Table 4). The hyperbranched polyglycerols may sufficiently alter water contact agent to be suitable for use as a wettability alternation agent (e.g., see Table 5). The hyperbranched polyglycerols may be suitable for adjusting the interfacial tension between crude oil and brine to be suitable for use in enhanced oil recovery (e.g., see Table 6). The hyperbranched polyglycerols may sufficiently boast foam volume, e.g., compared to traditional foam boasters, while still being stable at high temperature and/or high salinity conditions (e.g., see Table 7).

The hyperbranched polyglycerol is used as an additive in an enhanced oil recovery process. The hyperbranched polyglycerol may be present in an amount from 0.001 wt % to 10.000 wt % (e.g., 0.001 wt % to 5.000 wt %, 0.001 wt % to 3.000 wt %, 0.001 wt % to 1.000 wt %, 0.001 wt % to 0.500 wt %, 0.001 wt % to 0.100 wt %, etc.) based on a total weight of the composition. The composition may further include water and/or steam, based on the type of enhanced oil recovery process being used.

The hyperbranched polyglycerol according to embodiments, are believed to be usable as a multipurpose additive for enhanced oil recovery from subterranean reservoirs. Further, the hyperbranched polyglycerol is believed to be able to tolerate the harsh temperature of subterranean reservoirs. For example, hyperbranched polyglycerol is believed to be able to tolerate the salinity conditions of recycled water used in enhanced oil recovery from subterranean reservoirs.

EXAMPLES

Approximate properties, characters, parameters, etc., are provided below with respect to the illustrative working examples, comparative examples, and the information used in the reported results for the working and comparative examples.

The materials principally used are the following:

| | |
|---|---|
| Glycidol | A solution of greater than 95 wt % Glycidol (available from Sigma-Aldrich ®). |
| C8-OH | An initiating alcohol that is a solution of greater than 98 wt % of 1-Octanol (available from Sigma-Aldrich ®). |
| C12-OH | An initiating alcohol that is a solution of greater than 98 wt % of 1-Dodecanol (available from Sigma-Aldrich ®) |
| C18-OH | An initiating alcohol that is a solution of greater than 95 wt % of 1-Octadecanol (available from Sigma-Aldrich ®) |
| 15-S-3 | A secondary alcohol ethoxylates product available as TERGITOL ™15-S-3 from The Dow Chemical Company. |
| 15-S-40 | A secondary alcohol ethoxylates product available as TERGITOL ™ 15-S-40 from The Dow Chemical Company. |
| AOS | An alpha-olefin sulfonate available as Witconate ™ AOS-12 from AlczoNobel as a foam booster and wetting agent. |
| Cation Exchange Resin | A strong acid cation exchange resin, for use in industrial and residential softening and demineralization applications, available as DOWEX ™ MARATHON ™ C Resin from The Dow Chemical Company. |

Examples of the HPG material are made as discussed below based on anionic ring opening polymerization of glycidol. The synthesis of the HPG material is carried out in a 3-neck round bottom flask (250 mL) equipped with a mechanical stirrer, condenser, and low nitrogen flow. The initiating alcohol (0.1 mole) is added to the dry apparatus. Toluene (~150 mL) is added and heated to reflux to remove residual water in the alcohol by azeotropic distillation. Then, the flask is allowed to cool to room temperature. Sodium hydride (0.1 mol equivalent based on the hydrophobe) is added to the stirring alcohol in the flask and allowed to react for approximately 1 hour under nitrogen. The reaction mixture is heated to 70° C. and Glycidol (distilled and stored under nitrogen) is added using a syringe pump (with dry syringe and needles) at a rate of 1-1.5 mL/hr. Upon completion of Glycidol addition, stirring is continued at 70° C. for a few hours. The resultant reaction mixture is allowed to cool to room temperature and then quenched with methanol (~150 mL) to dissolve the resultant crude HPG material. Then, the Cation Exchange Resin is added and stirring is continued for 2 hours. The Cation Exchange Resin is removed by filtration, then the HPG material is precipitated from methanol diethyl ether three times. Prior to the precipitation, the methanol solution of the HPG material may need to be concentrated by removal of some of the methanol under reduced pressure in order to yield a good precipitate. The HPG material is dried in a vacuum oven in order to remove excess diethyl ether or methanol from the final product.

For each of HPG-1 to HPG-11, the ROH used in provided in Table 1, below.

TABLE 1

| Example No. | ROH | Cloud Point (° C.) | CMC (@ 1 wt %) |
|---|---|---|---|
| HPG-1 | C8-OH | >140 | 0.50 |
| HPG-2 | C8-OH | >140 | 0.61 |
| HPG-3 | C8-OH | >140 | 0.60 |
| HPG-4 | 15-S-3 | >140 | 0.12 |
| HPG-5 | 15-S-3 | >140 | 0.16 |
| HPG-6 | C12-OH | >140 | 0.01 |
| HPG-7 | 15-S-3 | >140 | 0.11 |
| HPG-8 | C12-OH | >140 | 0.02 |
| HPG-9 | 15-S-3 | >140 | 0.15 |

TABLE 1-continued

| Example No. | ROH | Cloud Point (° C.) | CMC (@ 1 wt %) |
|---|---|---|---|
| HPG-10 | C18-OH | >140 | 0.01 |
| HPG-11 | C18-OH | >140 | 0.03 |

Referring to Table 1, the cloud point for Each of HPG-1 to HPG-11 is determined by obtaining initial cloud point measurements by using a 1% solution of the HPG material in water. The solutions are placed in sealed glass tubes and evaluated using a Mettler FP81C Cell attached to a Mettler Toledo FP90 Central Processor. Samples are evaluated up to the maximum temperature of the instrument (140° C.), which is the desirable minimum cloud point for enhanced oil recovery processes and is an indication of successful synthesis of the HPG material. As such in Table 1, the HPG materials are advantageously found to be stable (i.e., non-cloudy) at temperatures greater than 140° C. Thus, the HPG materials are believed to be usable in the high temperature conditions of subterranean reservoirs.

Further, CMC, which is critical micelle concentration is determined using a Kibron Delta-8 multichannel microtensiometer system in which the HPG material is added in an amount of 1 wt % in an aqueous solution. CMC is the concentration of additives at which aggregates are determined to become thermodynamically soluble in an aqueous solution. Such that above the CMC the solubility of the additive within the aqueous solution is believed to be exceeded. Accordingly it is shown that HPG-1 to HPG-11 can be stable polymers at high temperatures and can be usable in the high temperature environment of oil recovery.

Referring to Table 2, the examples of HPG-1 and HPG-3 to HPG-10 are evaluated for interfacial (surface) tension that exists when two phases, such as oil and water are present. The interfacial tension is the force that holds the surface of a particular phase together and is provided below in Table 2 as measurements based on dynes/cm. For Table 2, the interfacial tension is evaluated for a 1 wt % solution of the HPG material in brine example in Dodecane at varying temperatures.

TABLE 2

| Example No. | IFT @ 110° C. | IFT @ 130° C. | IFT @ 150° C. | IFT @ 170° C. |
|---|---|---|---|---|
| HPG-1 | 3.61 | 5.59 | 8.86 | 12.11 |
| HPG-3 | 9.90 | 13.23 | 15.32 | 17.66 |
| HPG-4 | 4.28 | 3.80 | 3.31 | 3.25 |
| HPG-5 | 6.82 | 6.13 | 5.02 | 3.41 |
| HPG-6 | 6.44 | 6.08 | 5.52 | 5.20 |
| HPG-7 | 5.86 | 6.04 | 5.32 | 4.64 |
| HPG-8 | 8.79 | 8.42 | 8.03 | 9.58 |
| HPG-9 | 6.18 | 5.80 | 5.41 | — |
| HPG-10 | 7.37 | 6.60 | 6.06 | 5.53 |
| 15-S-40 | 2.89 | cloudy | cloudy | cloudy |

Interfacial tension (IFT) data for the HPG materials is obtained using a Tracker Tensiometer. For this test, dodecane is used as the oil drop phase and a 1% solution of the HPG surfactant in water was used as the bulk phase. Interfacial tension measurements are made at 110, 130, 150, and 170° C. and at least two measurements are performed at each temperature. Of key significance is the fact that cloudiness is not observed up to 170° C. for any of the HPG materials. In particular, it is seen that HPG examples are able to maintain a low surface tension between the water and Dodecane, even at elevated temperatures such as 170° C. In comparison, 15-S-40, a secondary alcohol vs the primary alcohol of the HPG materials, became ineffective at maintaining the desired surface temperature at 130° C., as the solution became cloudy. This property is a highly desirable quality for enhanced oil recovery processes. No measurement is obtained for sample HPG-9 at 170° C. because the droplet was lost during the run. Interfacial tension (IFT) data for the HPG samples was obtained using a Tracker Tensiometer. By low surface tension it meant a surface tension of less than 20.00 dynes/cm at a temperature of 170° C. or less. Thus, the HPG materials are believed to be usable in the high temperature conditions of subterranean reservoirs (e.g., as surfactants).

The examples of HPG-1 to HPG-11 are evaluated for adjustment of fluid viscosity to assess the ability to use the HPG materials in oil recovery. In particular, varying samples are prepared with different weight percentages of HPG-1 to HPG-11 in water. Referring to Table 3, below the viscosity measurements for HPG-1 to HPG-11 samples are measured at 1 wt % to 70 wt % of the HPG in water. In Table 3, 1 wt % refers to 1 wt % of the HPG material in 99 wt % of water and 70 wt % refers to 70 wt % of the HPG material in 30 wt % of water.

TABLE 3

| Example No. | 1 wt % | 10 wt % | 20 wt % | 30 wt % | 40 wt % | 50 wt % | 60 wt % | 70 wt % |
|---|---|---|---|---|---|---|---|---|
| HPG-1 | 3.2 | 3.1 | 4.5 | 7.2 | 14.2 | 46.9 | — | 499.5 |
| HPG-2 | 3.5 | 4.7 | 5.0 | 8.7 | 12.5 | 38.8 | 164.2 | — |
| HPG-3 | — | 3.6 | 4.8 | 8.7 | 17.5 | 61.3 | 126.1 | — |
| HPG-4 | 3.5 | 3.7 | 4.7 | 11.1 | 62.0 | 235.4 | — | — |
| HPG-5 | 3.3 | — | — | — | — | — | — | — |
| HPG-6 | 3.2 | 3.3 | 4.9 | 9.8 | 30.3 | 105.4 | 360.2 | — |
| HPG-7 | — | 4.0 | 4.7 | 10.0 | 14.6 | 55.4 | 156.2 | — |
| HPG-8 | 3.4 | 3.7 | 5.6 | 12.4 | 33.4 | 293.8 | 928.1 | — |
| HPG-9 | 3.1 | 3.5 | 4.6 | 8.6 | 16.7 | 46.1 | 133.0 | — |
| HPG-10 | 3.4 | — | — | — | — | — | — | — |
| HPG-11 | 3.4 | 5.6 | 5.0 | 9.1 | 21.3 | 56.8 | 168.1 | — |

Viscosity (cp) for the data in Table 3 is measured on a Hamilton automated liquid dispenser using a TADM (Total aspiration and dispense monitoring) program, at room temperature (e.g., approximately 23° C.). The data is provided in units of centipoise at room temperature.

The HPG materials are found to have a relatively low viscosity at concentration of around 10% of HPG in water which has viscosity less than 6 cp. When the HPG material is blended with water at varying concentrations, even at concentrations of 50 wt % HPG to 50 wt % water, the viscosity is less than 300 cp. Thus, the HPG materials are believed to be usable as additive for water (such as recycled water), in varying amounts, in an enhanced oil recovery process for subterranean reservoirs.

The ability of the HPG materials to withstand the harsh salinity conditions of recycled water is studying by looking to phase separation. In particular, the phase separation behavior using HPG materials is studied using salinity solutions. Referring to Table 4, commercially available AOS and experimental HPG-6, HPG-7, and HPG-9 are evaluated at 4% salinity and 12% salinity at temperatures ranging from 25° C. to 80° C. The examples are prepared by blending 4% NaCl and 12% NaCl by weight in distilled water, then the additive is blended in the concentration of 1% in 4% and 12% in brine separately using the impeller at a speed of 300 rpm. Phase separation is observed over the period of 30 minutes. The examples are heated using a hot plate to achieve different temperature ranges.

TABLE 4

| | 4% Salinity | | | 12% Salinity | | |
|---|---|---|---|---|---|---|
| | 25° C. | 50° C. | 80° C. | 25° C. | 50° C. | 80° C. |
| HPG-6 | Clear | Clear | Clear | Clear | Clear | Clear |
| HPG-7 | Clear | Clear | Clear | Clear | Clear | Clear |
| HPG-9 | Clear | Clear | Clear | Clear | Clear | Clear |
| AOS | Clear | Clear | Clear | Cloudy | Phase Separation | Phase Separation |

Referring to Table 4, an indication of Clear means small particles are not observed by the naked eye in the sample and the sample is essentially clear. An indication of Cloudy means a white-ish color is observed in the sample, but clear phase separation is not observed by the naked eye. An indication of Phase Separation means small particles in the liquid phase are observed by the naked eye and deemed to be an indicate of separation between solid and liquid phases in the sample.

As can be seen in Table 4, the HPG materials are miscible in both the 4% and 12% salinity solutions at temperatures from 25° C. to 80° C. However, the commercially available AOS sample is not miscible in the 12% salinity solutions at temperatures from 25° C. to 80° C. Thus, the HPG materials are believed to be usable in the high salinity conditions of recycled water used in enhanced oil recovery from subterranean reservoirs, as opposed to the AOS sample.

Water contact angle may be used to measure the wettability of a surface or material. Wetting refers to how a liquid deposited on a solid substrate spreads out or the ability of liquids to form boundary surfaces with solid states. The contact angle is the angle formed between the liquid-solid interface. The HPG materials are evaluated for wettability alternation based on contact angles. In particular, wettability alteration ability on the reservoir cores is measured using HPG samples at 2000 ppm in 10,978 ppm TDS brine and using carbonate (limestone) cores. The cores are aged in crude oil by soaking them in a reservoir crude oil sample for 24 hours at 25° C. The brine without an HPG sample drop is placed in crude oil aged cores to measure the contact angle. Then, the brine with an HPG material at 2000 ppm level concentration is placed on the crude oil aged cores to measure the contact angle.

Referring to Table 5, the HPG materials can change the contact angle of the water drop from >90° to significantly less than 90°. This is an indication that the HPG material may change the contact angle for rock to become water-wet, which in turn can change the capillary pressure for water from negative to positive to enter the tight pores in the reservoir to drain the oil from tight pores to improve oil recovery.

TABLE 5

|  | Contact Angle (° C.) |
| --- | --- |
| HPG-1 | 40.7 |
| HPG-4 | 43.2 |
| HPG-7 | 40.0 |
| HPG-9 | 50.0 |

Interfacial (surface) tension (IFT) is measured at 60° C. between crude oil and brine samples (with total dissolved salts of around 100,978 ppm) with and without an HPG sample (see Control). The IFT is measured using a spinning drop apparatus by Kruss at the concentrations provided in Table 6, below. In particular, approximately 5 ml of brine sample is used for the measurement, by putting brine in spinning drop tube and then small droplet of oil was inserted using a typical procedure described in Kruss spinning drop manual.

TABLE 6

|  | Concentration in Brine (ppm) | IFT Between Crude Oil and Brine (dynes/cm) |
| --- | --- | --- |
| HPG-1 | 5000 | 5.29 |
| HPG-6 | 5000 | 6.93 |
| HPG-7 | 5000 | 5.15 |
| HPG-9 | 5000 | 5.57 |
| Control | 0 | 25.38 |

Referring to Tables 5 and 6, the HPG material may provide excellent efficacy in changing the wettability of the rock from oil-wet to water-wet and provide a workable IFT between crude oil and brine. As such it is believed the HPG material may be able to provide significant imbibition of water in tight pores to drain the oil from a reservoir for improved oil recovery from that reservoir. Thus, the HPG materials are believed to be usable as a wettability alternation additive for enhanced oil recovery from subterranean reservoirs.

Foam forming tests are performed for the HPG material. In particular, the commercially available AOS and experimental HPG-6, HPG-7, and HPG-9 are evaluated at 4% salinity, in an amount of 2000 ppm, using a Telis Foam Scan instrument to measure foam volume (mL) overall a period ranging from 0 seconds to 300 seconds. All examples have are estimated to have a foam volume of 0 mL @ 0 seconds. The estimated foam volumes at 50 seconds and 300 seconds are shown below in Table 7.

TABLE 7

|  | Foam Volume (mL) +169 4% Salinity | | | |
| --- | --- | --- | --- | --- |
|  | 50 sec 50° C. | 300 sec 50° C. | 50 sec 80° C. | 300 sec 80° C. |
| HPG-6 | 100 | 105 | 140 | 120 |
| HPG-7 | 100 | 105 | 140 | 120 |
| HPG-9 | 100 | 105 | 140 | 120 |
| AOS | 100 | 110 | 140 | 180 |

It is believed that the both provide comparable performance with respect to foam volume control. In particular, all the examples see a rapid increase in foam volume in a period from at least 0 seconds to 50 seconds. Further, all the examples realize good performance at 300 seconds.

The invention claimed is:

1. A method of enhanced oil recovery, the method comprising:
   injecting a composition consisting of an hyperbranched polyglycerol into an injection well in a subterranean oil-bearing reservoir, where the hyperbranched polyglycerol consists of a primary alcohol that is a reaction product of a $C_2$ to $C_{25}$ carbon alcohol and a plurality of glycidols; and
   displacing oil in the subterranean oil-bearing reservoir using the composition.

2. The method as claimed in claim 1, wherein the hyperbranched polyglycerol has a nominal hydroxyl functionality of at least 4.

3. The composition as claimed in claim 1, wherein the hyperbranched polyglycerol is present in an amount from 0.001 wt % to 10.000 wt %, based on a total weight of the composition.

4. The process as claimed in claim 1, wherein the enhanced oil recovery process is a foam-assisted enhanced oil recovery process.

5. The process as claimed in claim 1, wherein the enhanced oil recovery process is a water flooding enhanced oil recovery process.

6. The process as claimed in claim 1, wherein the enhanced oil recovery process is a steam assisted enhanced oil recovery process.

* * * * *